United States Patent
Kletter

[19]

[11] Patent Number: 5,938,185
[45] Date of Patent: Aug. 17, 1999

[54] CUTTING BOARD ASSEMBLY

[76] Inventor: Howard Kletter, 210 Wickerberry Hollow, Roswell, Ga. 30075

[21] Appl. No.: 08/922,651

[22] Filed: Sep. 3, 1997

[51] Int. Cl.$^6$ ..................................................... B23Q 3/00
[52] U.S. Cl. ..................... 269/289 R; 269/15; 269/302.1
[58] Field of Search ............................ 269/289 R, 302.1, 269/13, 15, 16; 5/606

[56] References Cited

U.S. PATENT DOCUMENTS

| | | | |
|---|---|---|---|
| 893,703 | 1/1908 | Butler | 269/289 |
| 2,609,024 | 9/1952 | Russ | 269/15 |
| 4,082,257 | 4/1978 | Strickland | 269/328 |
| 4,440,385 | 4/1984 | Kingery . | |
| 4,653,737 | 3/1987 | Haskins et al. | 269/13 |
| 4,907,789 | 3/1990 | Tice . | |
| 5,366,208 | 11/1994 | Benjamin . | |
| 5,527,022 | 6/1996 | Gibson . | |

FOREIGN PATENT DOCUMENTS

| | | | |
|---|---|---|---|
| 2916-435 | 11/1980 | Germany | 269/289 R |

*Primary Examiner*—David A. Scherbel
*Assistant Examiner*—Benjamin M. Halpern
*Attorney, Agent, or Firm*—Kenneth L. Tolar

[57] ABSTRACT

The present invention relates to a new and improved cutting board assembly comprising a base component having a substantially rectangular cutting surface with two opposing side walls depending therefrom. The area between the cutting surface and side walls define an interior chamber. The cutting surface has a plurality of apertures aligned in substantially parallel rows which are received within longitudinal channels having downwardly converging sidewalls for directing juices produced from cut food items into the apertures. A hollow cylindrical conduit is in fluid communication with the apertures and the interior chamber. Slidably received within the interior chamber of the base component is a drawer type collection tray which may be easily removed therefrom for receiving juices from the conduits. The base component also has a pair of substantially C-shaped support members each attached to an opposing side wall for elevating the cutting surface a predetermined distance from a table or kitchen counter. The C-shaped support members also provide a surface on which the drip tray rests when received within the interior chamber and on which the tray slides when inserted or removed therefrom.

5 Claims, 3 Drawing Sheets

CUTTING BOARD ASSEMBLY

BACKGROUND OF THE INVENTION

Whenever food items are cut or sliced using a cutting board or chopping block, juices generated from the foods flow from the cutting board to the surrounding area such as a kitchen counter creating a sloppy and hazardous environment. Also, many times it is desirable to collect and use these juices, especially meat juices, as ingredients in other dishes or as a gravy to garnish the meat. The present invention relates to a cutting board used to cut food items such as vegetables, fruits and meat. The device comprises a drawer like collection tray for receiving juices generated by the cut food items which may easily be removed without relocating or handling the cutting board. Furthermore, the cutting surface has a unique drain means which ensures that all of the juices seeping onto the cutting surface are drained and collected.

DESCRIPTION OF THE PRIOR ART

The prior art cutting boards which are capable of draining and collecting juices generally comprise channels or slots disposed around the periphery of the cutting board for receiving the juices as they seep toward the outer edges thereof. The juices then fall into a collection and storage receptacle such as a tray. The prior art drain systems are inadequate for several reasons. Because the juices must travel a predetermined distance to the peripheral edges of the cutting surface in order to reach the drain slot or channel, the cutting surface often becomes sticky and covered with dried juices. In cases where a small piece of meat or a small food item such as a piece of fruit is being cut, a portion of the juices generated will dry before reaching the peripheral channels or slots so that collection and later use of the juices are not possible.

Removing and draining the prior art juice receptacles is cumbersome, laborious and often creates a mess. The cutting board is typically mounted within the collection tray so that in order to remove or store the juices, the cutting board must be lifted and removed therefrom. Juices which remain on the cutting board will then drip onto the kitchen counter, floor or table resulting in additional mess and inconvenience. Alternatively, the food item resting on the cutting board must be relocated and any remaining juices must be poured into the receptacle prior to removing juices therefrom.

U.S. Pat. No. 5,527,022 issued to Gibson discloses a cutting board having a substantially planar rectangular body with a handle and a juice channel along each of three peripheral sides of the board. The device also has a sloping glide plane allowing juices to flow into the channels from which they can be drained.

U.S. Pat. No. 5,366,208 issued to Benjamin discloses a cutting board removably mountable within an accompanying drip pan tray. Each of the four peripheral sides of the cutting board surface have a notch through which the juices flow into the drip pan below.

U.S. Pat. No. 4,907,789 issued to Tice discloses a cutting board having a cutting surface and a groove around the periphery thereof. The groove is inclined toward an elongated slot which extends through the cutting surface and is surrounded by an L-shaped flange. The plastic bag is mounted to the L-shaped flange for receiving fluids from the cut meat.

U.S. Pat. No. 4,440,385 issued to Kingery discloses a cutting board with a plurality of rod members which fit within longitudinally extended recesses and that can be raised and lowered as desired relative to a transverse block/handle portion. None of the above described devices have a drawer type collection tray or drain apertures disposed about both the periphery and the interior of the cutting surface to solve the problems described above.

SUMMARY OF THE INVENTION

The present invention relates to a new and improved cutting board assembly that overcomes the disadvantages of the prior art devices comprising a base component having a flat substantially rectangular cutting surface and two substantially parallel side walls depending therefrom. The area between the cutting surface and the two side walls defines an interior chamber. The cutting surface has a plurality of substantially parallel rows of drain apertures disposed on its exterior surface. Each row of apertures is received within a channel having two opposed, downwardly converging side walls for directing juices from the cutting surface into the apertures. Each of the drain apertures is integral and in communication with a conduit for delivering food juices into a collection tray below. The specially designed juice drainage system allows substantially all of the generated juices to be drained directly below without traveling a predetermined distance along the cutting surface. A collection tray is slidably received within the interior chamber of the base component and horizontally extendable therefrom in a drawer like fashion allowing the tray to be easily removed irrespective of the cutting surface. Furthermore, a pair of substantially C-shaped supports are attached to the opposing sides of the base component which elevate the device a predetermined distance above a kitchen counter or table. The supports also provide a guide track on which the collection tray can rest or slide into or out of the base component.

It is therefore an object of the present invention to provide a cutting board assembly having a removable, drawer type collection tray.

It is yet another object of the present invention to provide a cutting board assembly which can easily drain food juices directly from the cutting surface into a collection device.

It is yet another object of the present invention to provide a cutting board assembly which can more efficiently drain and collect juices from foods cut thereon.

It is yet another object of the present invention to provide a cutting board assembly designed to quickly and efficiently remove substantially all juices generated by cut food items from the cutting surface. Other objects, features and advantages of the present invention will become readily apparent to those skilled in the art from the following detailed description of the preferred embodiment when considered with the attached drawings and the appended claims.

DESCRIPTION OF THE PREFERRED EMBODIMENT

Figure 1:
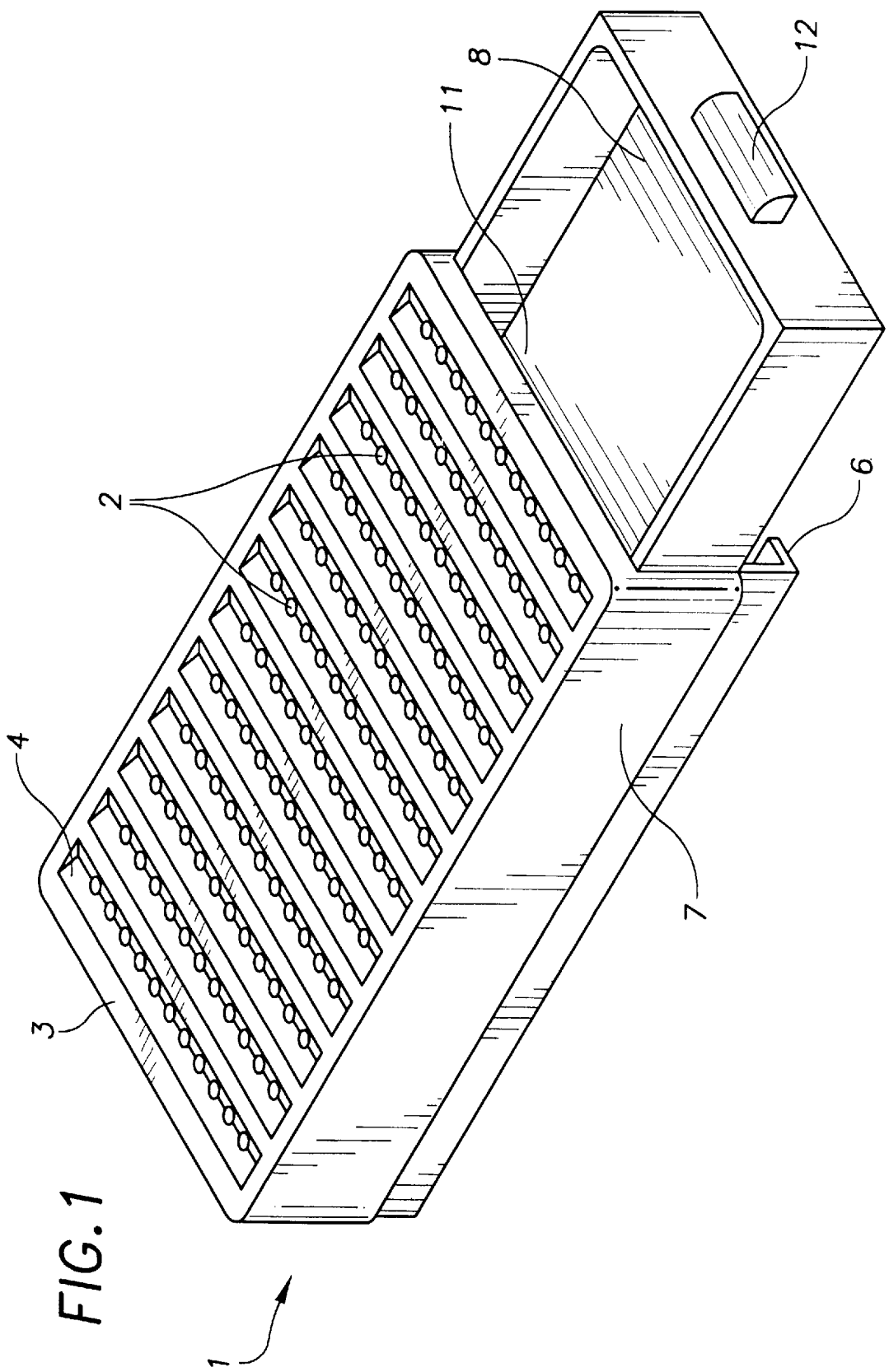
FIG. 1 depicts the inventive device with the drawer type drip tray partially extended therefrom.
Figure 2:
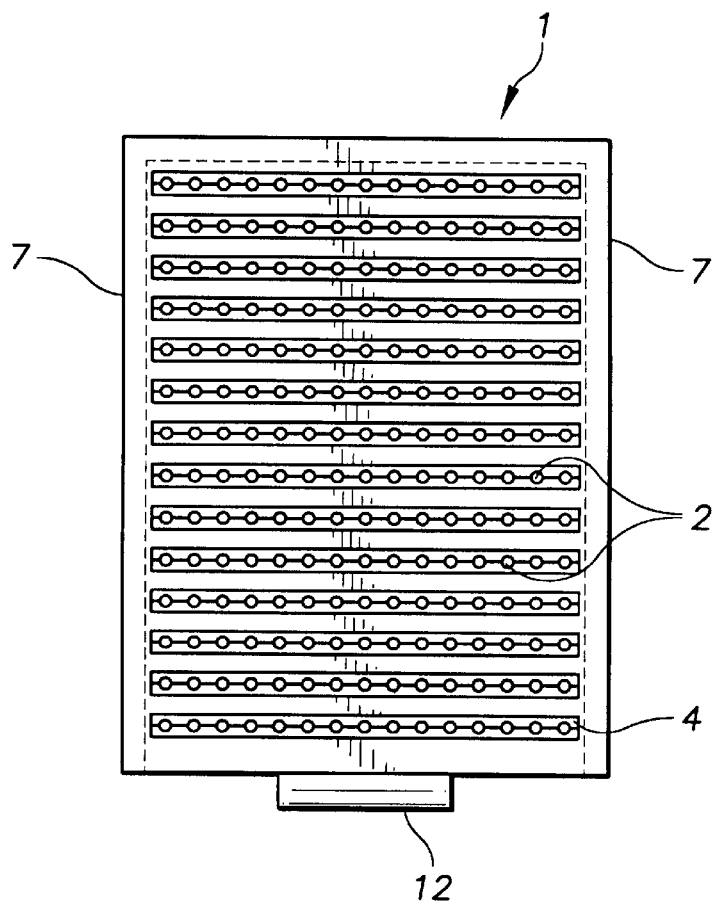
FIG. 2 is a top view of the inventive device depicting the parallel rows of drain apertures disposed on the cutting surface.
Figure 3:
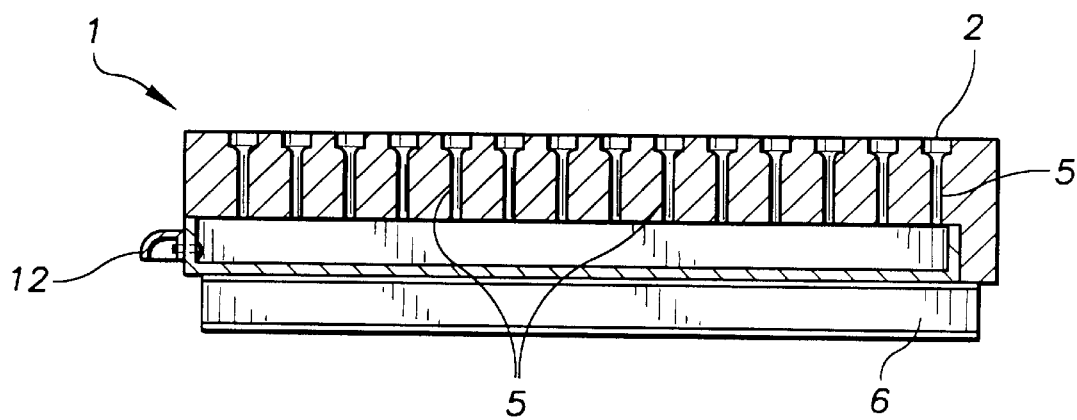
FIG. 3 is a side, cross sectional view of the inventive device depicting the drain holes in communication with the drain conduit.
Figure 4:
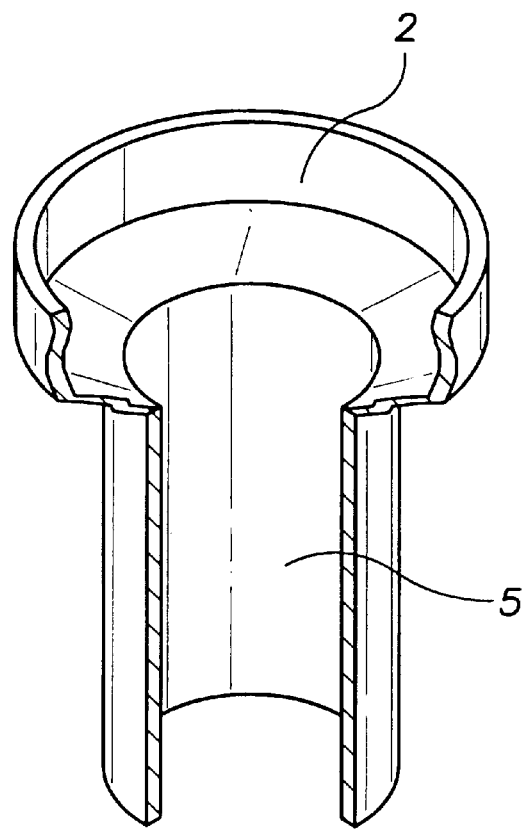
FIG. 4 is a view of the drain aperture and conduit system.
Figure 5:
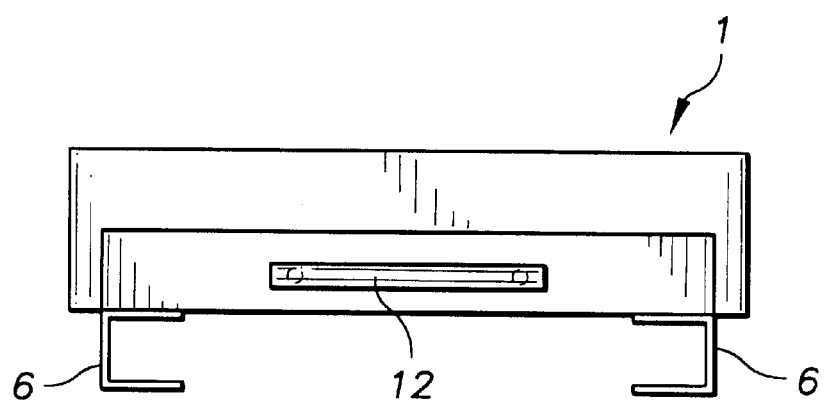
FIG. 5 is a front view of the inventive device depicting the collection tray drawer handle and support members.

Referring now to FIGS. 1 through 5, the present invention comprises a base component 1 having a flat, substantially rectangular cutting surface 3 and two opposing side walls 7 downwardly depending therefrom. The area between the cutting surface and the two side walls defines an interior chamber 11 for receiving a drawer type collection device 8 as will be described below.

On the exterior of the cutting surface 3 are a plurality of apertures 2 aligned in substantially parallel rows. Each row of apertures is received within a longitudinal channel 4 having substantially downwardly converging, opposing side walls to more efficiently direct food juices from the cutting surface 3 to the apertures. A conduit 5 is integrally connected to and in fluid communication with each aperture. A distal end of each drainage conduit 5 is open and is in communication with the interior chamber 11 thereby providing a plurality of proximally disposed drain paths from the cutting surface 3 to the interior chamber 11.

A substantially C-shaped support member 6 is attached to each of the opposing side walls 7 to elevate the base component a predetermined distance from a support surface such as a table or kitchen counter. Slidably received within the interior chamber 11 of the base component 1 is a substantially rectangular drawer type collection tray 8 having a bottom surface, four side walls depending therefrom and an open top. The bottom surface slidably engages each of the opposing C-shaped support members 6 allowing the tray to slide into or out of the base component interior chamber 11 similar to a conventional drawer. When completely inserted into the interior chamber 11 of the base component 1, its open top will be directly below the open ends of the conduits to receive juices flowing therefrom. The C-shaped support members 6 also provide a surface on which the collection tray rests when completely inserted into the interior chamber 11.

Attached to a side of the tray is a handle 12 which may be easily grasped by a user when removing or inserting the collection tray 8. In an alternative embodiment, guides for the drawer type collection tray 8 may be integral with the base component, horizontally depending from the two opposing side walls. The C-shaped support members 6 may be attached thereto or to the bottom surface of the side walls.

To use the device as described above, the base component 1 is placed on a flat surface such as a table or a kitchen counter top. The drawer type collection tray 8 is slid within the interior chamber of the base component 1 with its bottom surface slidably engaging the C-shaped support members 6. Foods are then placed on the cutting surface 3 and sliced as desired. Juices emanating from the cut food items will then drain directly into the channels 4, through the apertures/conduits and into the drawer type collection tray 8. The collection tray 8 is slid out of the base component 1 and the juices may then be used for garnishing or discarded if desired. The tray 8 may be removed without disturbing the cutting surface or any food items resting thereon.

As will be readily apparent to those skilled in the art, the shape, size and materials of construction of the above described invention may be varied. From the above description, it is now apparent that the present invention relates to a new and improved cutting board assembly having a unique juice drainage system and a drawer type juice collection tray. Although there has been shown and described the preferred embodiment the present invention, it will be readily apparent to those skilled in the art that modifications may be made thereto which do not exceed the scope of the claimed invention. Therefore, the scope of the invention is to be limited only by the appended claims.

What is claimed is:

1. A cutting board assembly comprising:

a base component having a substantially rectangular, planar cutting surface and two opposing side walls depending therefrom, the area between which defines an interior chamber;

said base component also including a pair of substantially C-shaped support members each attached to an opposing side wall of said base component for elevating the cutting surface a predetermined distance above a support surface;

a plurality of drainage apertures on said cutting surface each in communication with said interior chamber for receiving juices from food items being cut thereon and delivering said juices to said interior chamber;

a substantially rectangular collection tray having a bottom surface, four side walls depending therefrom and an open top surface, said collection tray slidably engaging said C-shaped support member thereby providing a means for receiving juices from the drainage apertures so that the received juices may be removed and discarded irrespective of the cutting surface.

2. A device according to claim 1 wherein said collection tray further comprises a handle means attached to a side thereof.

3. A device according to claim 1 wherein said apertures are disposed in substantially parallel rows on said cutting surface.

4. A device according to claim 1 wherein each row of apertures is received within a longitudinal channel on said cutting surface each having a pair of opposing downwardly converging side walls for directing juices from the cutting surface to the apertures.

5. A device according to claim 1 further comprising:

a hollow, tubular conduit integral with each of said apertures and in communication therewith and said interior chamber thereby providing a path for juices to flow from said apertures to said collection tray.

* * * * *